(12) United States Patent
Hammer et al.

(10) Patent No.: US 11,471,846 B2
(45) Date of Patent: Oct. 18, 2022

(54) CATALYTIC REACTOR WITH LOAD DISTRIBUTOR ASSEMBLY

(71) Applicant: HALDOR TOPSØE A/S, Kgs. Lyngby (DK)

(72) Inventors: Marc Nybo Hammer, Taastrup (DK); Klaus Risbjerg Jarlkov, Køge (DK)

(73) Assignee: HALDOR TOPSØE A/S, Kgs. Lyngby (DK)

( * ) Notice: Subject to any disclaimer, the term of this patent is extended or adjusted under 35 U.S.C. 154(b) by 0 days.

(21) Appl. No.: 17/284,518

(22) PCT Filed: Dec. 4, 2019

(86) PCT No.: PCT/EP2019/083669
§ 371 (c)(1),
(2) Date: Apr. 12, 2021

(87) PCT Pub. No.: WO2020/126503
PCT Pub. Date: Jun. 25, 2020

(65) Prior Publication Data
US 2021/0339214 A1    Nov. 4, 2021

(30) Foreign Application Priority Data
Dec. 19, 2018  (EP) ..................................... 18213895

(51) Int. Cl.
B01J 8/00           (2006.01)
B01J 8/02           (2006.01)
(Continued)

(52) U.S. Cl.
CPC .......... B01J 8/0214 (2013.01); B01J 19/305 (2013.01); *B01J 2208/00884* (2013.01); *B01J 2219/0002* (2013.01); *B01J 2219/2492* (2013.01)

(58) Field of Classification Search
CPC ..... B01J 8/00; B01J 8/02; B01J 8/0207; B01J 8/0214; B01J 8/04; B01J 8/0446;
(Continued)

(56) References Cited

U.S. PATENT DOCUMENTS

| | | | |
|---|---|---|---|
| 2,595,384 A | 5/1952 | Johnsen et al. | |
| 3,235,344 A | 2/1966 | Curtis et al. | |
| 3,661,409 A | 5/1972 | Brown et al. | |
| 4,980,117 A * | 12/1990 | Blaushild | F16J 15/061 376/205 |

(Continued)

FOREIGN PATENT DOCUMENTS

WO       2017103199 A1    6/2017

OTHER PUBLICATIONS

Extended European Search Report dated Jun. 3, 2019, issued by the European Patent Office in the corresponding European Patent Application No. 18213895.5-1104. (7 pages).
(Continued)

*Primary Examiner* — Natasha E Young
(74) *Attorney, Agent, or Firm* — Buchanan Ingersoll & Rooney P.C.

(57) ABSTRACT

A catalytic reactor comprises a load distributor assembly to evenly transfer a load from equipment (internals) to a reactor support ring or support structure fixed within the reactor shell, thereby maximizing the possible load to be applied to the support ring or support structure without any hot-work modifications and without exceeding the allowable tensions/stress.

19 Claims, 6 Drawing Sheets

(51) Int. Cl.
*B01J 8/04* (2006.01)
*B01J 19/00* (2006.01)
*B01J 19/24* (2006.01)
*B01J 19/30* (2006.01)

(58) Field of Classification Search
CPC ........ B01J 8/0449; B01J 8/0453; B01J 19/00;
B01J 19/24; B01J 19/30; B01J 19/305;
B01J 2208/00; B01J 2208/00796; B01J
2208/00884; B01J 2219/00; B01J
2219/00002; B01J 2219/00018; B01J
2219/0002; B01J 2219/00024; B01J
2219/24; B01J 2219/2401; B01J
2219/245; B01J 2219/2491; B01J
2219/249
See application file for complete search history.

(56) References Cited

U.S. PATENT DOCUMENTS

| | | | |
|---|---|---|---|
| 5,891,405 | A | 4/1999 | Bianchi et al. |
| 10,576,449 | B2* | 3/2020 | Olbert .................. B01J 8/0453 |
| 2010/0209320 | A1 | 8/2010 | Daum et al. |
| 2017/0173547 | A1 | 6/2017 | Maas et al. |
| 2018/0369780 | A1 | 12/2018 | Olbert et al. |

OTHER PUBLICATIONS

International Search Report (PCT/ISA/210) and Written Opinion (PCT/ISA/237) dated Jan. 29, 2020, by the European Patent Office as the International Searching Authority for International Application No. PCT/EP2019/083669.

* cited by examiner

CATALYTIC REACTOR WITH LOAD DISTRIBUTOR ASSEMBLY

CROSS-REFERENCE TO RELATED APPLICATIONS

This application is a national stage application of International Application No. PCT/EP2019/083669, now WO 2020/126503, filed on Dec. 4, 2019, which claims priority to European Patent Application No. EP18213895.6, filed on Dec. 19, 2018.

FIELD OF THE INVENTION

This invention relates to a catalytic chemical reactor. More specifically the invention relates to a catalytic reactor with an internal support ring or support structure fixed on the inner side of the reactor shell and a load distributor assembly which can evenly distribute the load from any equipment/internals installed within the reactor and supported by the support ring or support structure.

The reactor can be a down-flow catalytic reactor which includes vertically superimposed packed beds of particulate catalytic material. This type of reactor is used in the petroleum and chemical processing industries for carrying out various catalytic reactions, such as sulphur and nitrogen conversion (HDS/HDN); hydrogenation of: olefins (HYD) and aromatics (hydrodearomatisation—HDA), metals removal (hydrodemetallisation—HDM), oxygen conversion (hydrodeoxygenation—HDO) and hydrocracking (HC). Alternatively, the reactor is a radial converter, where elements of the decks have to be fixed to the reactor. This reactor has a radial flow crossing a packed bed of catalytic material and it is typically used in the petroleum and chemical processing industries for carrying out catalytic reactions such as catalytic reforming and ammonia synthesis.

BACKGROUND OF THE INVENTION

It is well known to install and support equipment (also known as internals) such as distributor trays, quench mixers, catalyst supports etc. in a catalytic chemical reactor. Often the internals are supported on a reactor support ring or support structure fixed to the inner side of the reactor shell.

The reactor internal (distributor tray, quench mixer, catalyst support etc.) will simply hang from and/or stand/support on top of the support ring or support structure which is welded to the inner side of the reactor shell wall, weld over or forged into the base material of the reactor shell. These internals (installed equipment) must allow for reactor shell inner diameter tolerances and thermal expansion and therefore have some gap to the inner side of the reactor shell wall. In an oval reactor shell inner diameter shape, this gap will be larger in one direction and smaller perpendicular on the other direction. At the location with the largest gap, the momentum in the reactor support ring or support structure is relative higher than in the case of a perfect circular inner reactor shell wall, which can lead to stresses in the support ring or support structure that exceeds what is considered allowed. This may especially be the case in retrofitting situations, where extra internals need to be installed in existing reactor shells, with support ring or support structures that were not dimensioned for this extra unforeseen load to begin with.

This may in some situations lead to the need of reinforcing the support ring or support structure e.g. by welding reinforcement brackets between the reactor shell wall weld overlay and the support ring or support structure in order to reinforce the support ring or support structure to withstand the load. Often his kind of hot work on existing reactor shells is not an option or accepted because it may change the properties of the reactor shell material and it may require a following pressure test.

Hence, a problem exists with catalytic reactor internal support ring or support structure with insufficient support ability in general. For instance, the insufficient support ability may be caused by uneven tolerances both vertically and horizontally of the reactor shell inner wall as well as the support ring or support structure itself, insufficient dimensions of the reactor support ring or support structure (this list by all means not being exhaustive) just to mention a few. In U.S. Pat. No. 5,891,405, an exothermic heterogeneous catalytic synthesis reactor is described, including at least one catalytic bed arranged in a cylindrical shell and provided with a bottom plate for containment of the catalyst, and at least one supporting shoulder for the bottom plate extending from the shell. It includes a catalyst-seal support device including an annular element placed between the shoulder and the bottom plate. The annular element is fixed in a removable manner with the bottom plate and has a thermal expansion coefficient substantially equal to that of the shell.

U.S. Pat. No. 3,661,409A describes clamping wedges composed of similar tapered segments joined together by link bars and pins to form an unending chain whose circumference is varied by a threaded drive screw joining the end segments. Decreasing the chain circumference forces the wedges onto mating tapers on the conduit joint, drawing them together by mechanical advantage. Structure is provided for permitting limited axial movement of the damps during joint make-up to facilitate drawing together the parts to be joined from a separated position.

US2017173547A discloses a tray support insert and method of use for supporting one or more trays within a reactor chamber. The tray support insert includes at least one annular member which rests upon a support shoulder within the reactor chamber.

US2010209320A discloses a support ring for accommodating a plate-like element in a vessel includes a bracket disposed on a wall of the vessel and configured to support the plate-like element, the bracket having an upper supporting surface inclined downward relative to horizontal.

SUMMARY OF THE INVENTION

These above described problems are solved by the present invention, a catalytic chemical reactor comprising a load distributor assembly. The invention enables support ring or support structures with inadequate thickness or strength to be used for supporting equipment (internals) installed in the catalytic chemical reactor without the need of welding reinforcements to the reactor shell wall.

According to the invention, a catalytic reactor for chemical reactions is provided which comprises a reactor shell and a reactor support ring or support structure fixed to the inner side of this reactor shell. In some cases, the reactor support ring or support structure is fixed to the reactor shell by means of welding, often at the time of the manufacture of the catalytic reactor shell. The reactor support ring or support structure may have any geometrical shape; in some cases, the shape is rectangular when seen in a cross sectional view. The rectangular shape may have its widest dimension in a horizontal plane or a vertical plane or any plane there between. In some cases, the internal support structure in the catalytic reactor is not a support ring, but a number of brackets or flanges (support structure) distributed equally or unequally to the reactor shell. The present invention is also applicable for these reactor support structure setups.

The catalytic reactor further comprises a load distributor assembly, which is adapted to transfer a load supported on the load distributor assembly and further to the reactor support ring or support structure. The load may be any equipment, such as internals or other loads within the catalytic reactor which needs to be supported to keep a certain position and function within the chemical reactor. The load distributor assembly comprises load transfer means adapted to support on the upper side of the reactor support ring or support structure and adjacent to the inner side of the reactor shell. Hence, because of the load distributor assembly, any load supported within the catalytic reactor on the reactor support ring or support structure will be supported on the upper side of the reactor support ring or support structure as close to the inner wall of the reactor shell as possible, thereby reducing the length of the "torque arm" of the reactor support ring or support structure: the distance from the inner wall of the reactor to the center point of the load resting on the reactor support ring or support structure. The shorter distance from the inner wall of the reactor to the center point of the load resting on the reactor support ring or support structure, the smaller the tensions or stress in the fix (often the weld) of the reactor support ring or support structure to the reactor shell due to the load.

This close fit between the reactor support ring or support structure near the inner reactor shell wall and any internals supported on the reactor support ring or support structure or support structure requires delicate tolerances which are not always possible to achieve and therefore the tensions or stress in the fix of the reactor support ring or support structure to the reactor shell may be larger than allowed. This problem is solved by the catalytic reactor comprising a load distributor assembly with load transfer means which act as a middle layer between the reactor support ring or support structure and the load points of the internals, able to achieve the fine tolerances needed to transfer these load points to the upper side of the reactor support ring or support structure adjacent and as close as possible to the inner side of the reactor shell according to the present invention.

In a specific embodiment of the invention this essential distance from the load points to the upper side of the reactor support ring or support structure to the inner side of the reactor shell, the distance from the center of the lower side of the load transfer means and the inner side of the reactor shell is less than 100 mm. In a further specific embodiment said distance is less than 50 mm. These are specific embodiments relating to certain catalytic reactors. In other embodiments, the present invention may solve the described problems as well, even though the specific distance from the center of the lower side of the load transfer means and the inner side of the reactor shell may vary from the mentioned ranges.

In an embodiment of the invention, the load distributor assembly may comprise segments adapted to be fixed together. This can have several advantages. Some advantages are that segments may be easier to handle and install in the reactor shell due to for instance dimensions and weight. When the segments are brought into position in the reactor shell, they may be fixed together which can render the assembled load distributor as a stiff strong support. A further advantage is that the segmented load distributor assembly allows for fine adjustments of the assembled shape of the load distributor to achieve the optimal fit to the inner side of the reactor shell wall, as this may have wide tolerances to its intended shape. Hence, the segments which can be fine-tuned to fit the inner side of the reactor wall at the position of the reactor support ring or support structure contribute to fulfill the objective of the invention, to support any load within the catalytic reactor on the upper side of the reactor support ring or support structure as close to the inner side of the reactor wall as practically possible and with consideration of the tolerances of the reactor shell wall and the tolerances of the reactor support ring or support structure. These segments may be fixed together by any known means, such as bolts and nuts, threaded rods and nuts, welding or pins to be fitted into bores.

In an embodiment of the present invention, the load distributor assembly comprises circumference adjusting means, which as discussed above may contribute to achieve an optimal fit between the outer side of the load distributor assembly and the inner side of the reactor shell. Hence, the outer circumference of the load distributor assembly may be varied and adapted to the inner side of the reactor shell by said circumference adjusting means.

In a specific embodiment of the invention, the circumference adjusting means discussed above comprises one or more shims or threaded connections. This is for instance beneficial in the case where the load distributor assembly comprises a plurality of segments, where the distance between each of the segments may be fine adjusted by means of inlay shims or threaded connections between the segments. Not only can the entire circumference distance be varied in this way, but also the shape of the load distributor assembly can be closely fitted to the inner side of the reactor shell in whatever shape it may have, such as only by example: circular, oval, elliptic or any other shape.

As already discussed the shape and measures of the inner side of the reactor shell may, but also the level of the upper side of the reactor support ring or support structure may vary and have large tolerances. This may lead to uneven load on the support ring or support structure and critical tensions or stress in the areas where the reactor support ring or support structure is fixed to the inner side of the reactor shell and has a local high level, which may then get a relative high part of the load from any internals supported on the reactor support ring or support structure. Therefore, in a further embodiment of the invention, the load transfer means comprise a plurality of individually adjustable distribution members, which are adapted to fit the upper side of the reactor support ring or support structure, to even out any variations in the vertical position of any part of the reactor support ring or support structure. Thus, on each of the load transfer means, the distance from the part which supports on the upper side of the reactor support ring or support structure to the load distributor assembly can be adjusted individually, enabling the load distributor assembly to be arranged in a perfect horizontal position and supporting any load evenly distributed to the reactor support ring or support structure despite any tolerances, off horizontal installation and local vertical variations of the upper side of the reactor support ring or support structure. In an embodiment of the invention, each of the individually adjustable distribution members may also local vary its horizontal position relative to the load distributor assembly, to achieve an even more accurate fit to the inner side of the reactor shell.

In an embodiment of the invention, the load transfer means can be individually adjusted relative to the load distributor assembly by load transfer adjusting means. The load transfer adjusting means may in one embodiment comprise a screw and in a further embodiment a shim and in yet a further embodiment a flexible member. Also a combination of the mentioned examples can be employed. This may for instance be the case where shims are used to apply a first adjustment of each individually adjustable distribution members and one or more screws may subsequent be used to achieve a fines-adjustment. Or shims or screws may be used for a first adjustment in connection with a flexible member which may then be used as a fine adjustment and possibly also to allow for subsequent variations in the position of the reactor support ring or support structure during operation cycles. As the mentioned variations and combinations of load transfer adjusting means are only examples, it is clear that also other known adjusting means and other combinations may be employed.

In an embodiment of the invention, the individually adjustable distribution member comprises a gasket groove and the load transfer adjusting means comprises a gasket rope, which may be used in the environment of the catalytic reactor where temperatures and environment are elevated and possibly aggressive. An example is a glass fibre gasket rope. The gasket groove of the individually adjustable distribution member may be adapted to receive and support the gasket rope.

In an embodiment of the invention the load distributor assembly comprises a ring with a horizontal rectangular cross sectional part, which may be beneficial in terms of strength and manufacturing. In a further embodiment, the load distributer assembly also comprises a vertical rectangular cross sectional part which is fixed together with the horizontal rectangular cross sectional part. It is to be understood that horizontal rectangular cross section in this context means that it has a cross section which is rectangular and where the horizontal sides of the rectangle is longer than the vertical sides and vice versa for the vertical rectangular cross section. Furthermore, to fit a common shape of a catalytic reactor inner shell side, the load distributor assembly may in an embodiment have a circular outer circumference.

In an aspect of the invention a system for mounting a load distributor assembly as described in the above in a catalytic reactor for chemical reactions comprising a reactor shell and a reactor support ring or support structure fixed to the inner side of the reactor shell is claimed. The system enables accurate and easy mounting of the load distributor assembly in the catalytic reactor on the reactor support ring or support structure. The system comprises a segmented ring template which is adapted to fit the inner side of the reactor shell and the upper side of the reactor support ring or support structure. The segmented ring template may be adapted to fit the inner side of the reactor shell in same ways as the load distributor assembly as described earlier, i.e. by the use of shims, bolts and nuts, washers, threaded rods and nuts etc. The segmented ring template comprises apertures adapted to receive load transfer means for the load distributor assembly and locate them in an evenly distributed ring pattern of the reactor support ring or support structure. Hence, the system for mounting a load distributor facilitates an easy mounting of the load distributor assembly, but also helps to achieve an even and exact fit of the load transfer means to the reactor support ring or support structure as close to the reactor shell as practically possible. In an embodiment of the invention, the catalytic reactor comprising a load distributor assembly as described in the above, is a hydroprocessing reactor.

FEATURES OF THE INVENTION

1. A catalytic reactor for chemical reactions, comprising a reactor shell and a reactor support ring or support structure fixed to the inner side of the reactor shell and further comprising a load distributor assembly with load transfer means to transfer a load from the load distributor assembly to the reactor support ring or support structure, wherein said load distributor assembly is adapted support said load transfer means on the upper side of the reactor support ring or support structure and adjacent to the inner side of the reactor shell.

2. A catalytic reactor according to feature 1, wherein the distance from the centre of the lower side of said load transfer means and the inner side of the reactor shell is less than 100 mm, preferably less than 50 mm.

3. A catalytic reactor according to any of the preceding features, wherein said load distributor assembly comprises segments adapted to be fixed together.

4. A catalytic reactor according to feature 3, wherein the segments are fixed together by bolts and nuts, threaded rods and nuts, welding or pins and bores.

5. A catalytic reactor according to any of the preceding features, wherein the load distributor assembly comprises circumference adjusting means which enables the outer circumference of the load distributor assembly to fit the inner side of the reactor shell.

6. A catalytic reactor according to feature 5, wherein the circumference adjusting means comprises one or more shims or threaded connections.

7. A catalytic reactor according to any of the preceding features, wherein the load transfer means comprises a plurality of individually adjustably distribution members, adapted to be adjusted to fit the upper side of the reactor support ring or support structure.

8. A catalytic reactor according to any of the preceding features, wherein the load transfer means comprises a plurality of individually adjustable distribution members, adapted to be adjusted to fit the inner side of the reactor shell.

9. A catalytic reactor according to any of the preceding features, wherein the position of the load transfer means relative to the load distributor assembly is adapted to be adjusted by load transfer adjusting means.

10. A catalytic reactor according to feature 9, wherein the load transfer adjusting means comprises a screw.

11. A catalytic reactor according to feature 9, wherein the load transfer adjusting means comprises a shim.

12. A catalytic reactor according to feature 11, wherein the load transfer adjusting means comprises a flexible member.

13. A catalytic reactor according to any of the preceding features, wherein the individually adjustable distribution member comprises a gasket groove and the load transfer adjusting means comprises a gasket rope.

14. A catalytic reactor according to any of the preceding features, wherein the load distributor assembly comprises a ring with a horizontal rectangular cross sectional part.

15. A catalytic reactor according to any of the preceding features, wherein the load distributor assembly comprises a ring with a horizontal rectangular cross sectional part and a vertical rectangular cross sectional part which are fixed together.

16. A catalytic reactor according to any of the preceding features, wherein said load distributor assembly comprises circular ring segments adapted to be fixed together.

17. A catalytic reactor according to any of the preceding features, wherein the load distributor assembly has a circular outer circumference.

18. A system for mounting a load distributor assembly in a catalytic reactor for chemical reactions, comprising a reactor shell and a reactor support ring or support structure fixed to the inner side of the reactor shell, wherein the system comprises a segmented ring template adapted to fit the inner side of the reactor shell and the upper side of the reactor support ring or support structure, said segmented ring template comprises apertures adapted to receive load transfer means for the load distributor assembly and locate the load transfer means in an evenly distributed ring pattern on the reactor support ring or support structure.

19. A catalytic reactor according to any of the preceding features, wherein said catalytic reactor is a hydroprocessing reactor.

BRIEF DESCRIPTION OF THE DRAWINGS

The invention is further illustrated by the accompanying drawings showing examples of embodiments of the invention.

POSITION NUMBERS

01. Load distributor assembly
02. Reactor shell.
03. Reactor support ring.
04. Load distributor section.
05. Section connection flange.
06. Circumference adjusting means.
07. Bolt.
08. Nut.
09. Individually adjustable distribution member.
10. Load transfer adjusting means.
11. Segmented ring template.
12. Ring template segment.
13. Ring template aperture.

DESCRIPTION OF THE DRAWINGS

Some specific embodiments of the invention will be explained in more detail in the following with reference to the drawings as seen on FIG. 1 to FIG. 10.

Figure 1:
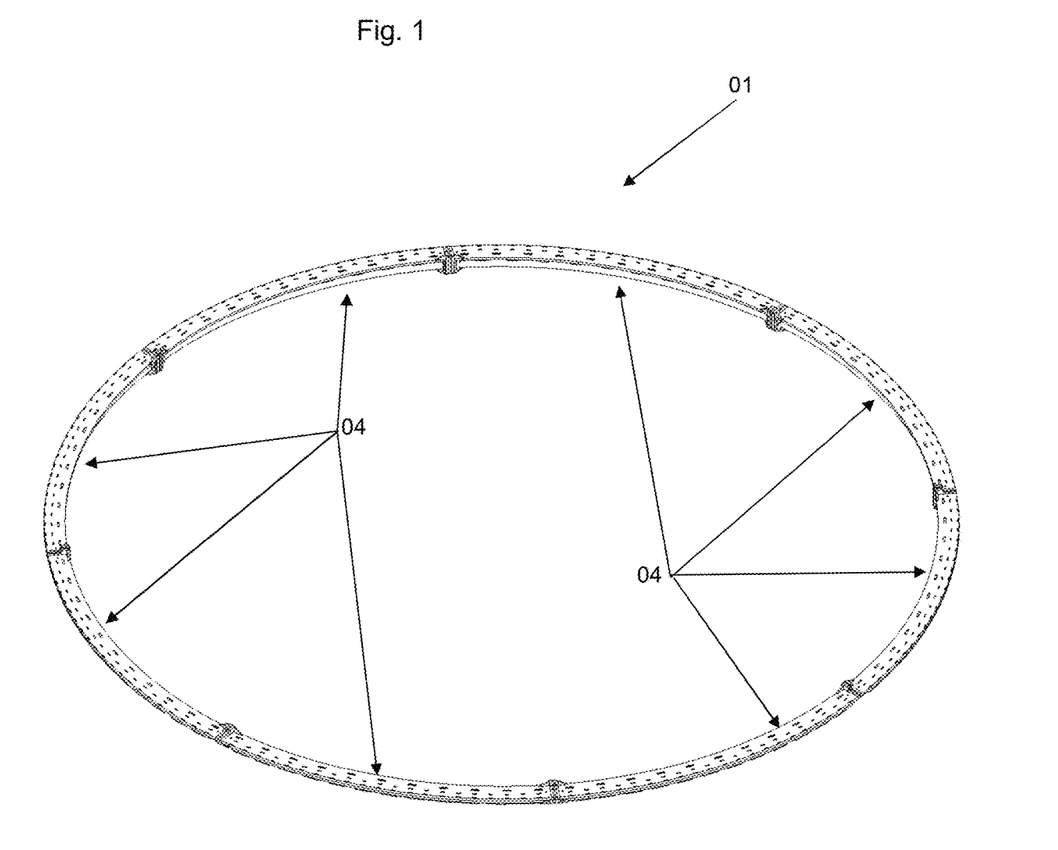
FIG. 1 shows an isometric view of the load distributor assembly.

A catalytic reactor for chemical reactions (not shown) comprises a reactor shell 02 which may have a reactor support ring or support structure 03 for supporting equipment, also known as "internals" to be installed in the catalytic reactor. According to the invention a load distributor assembly 01 as seen of FIG. 1 is located between the reactor support ring and the internals, carrying the internals and distributing the load of the internals evenly on the upper side of the reactor support ring as close to the inner side of the reactor shell as possible. As can be seen on FIG. 1, the load distributor assembly can be assembled from a plurality of load distributor sections 04, which in this embodiment are circular ring segments to form a circular load distributor assembly when fixed together end to end.

Figure 2:
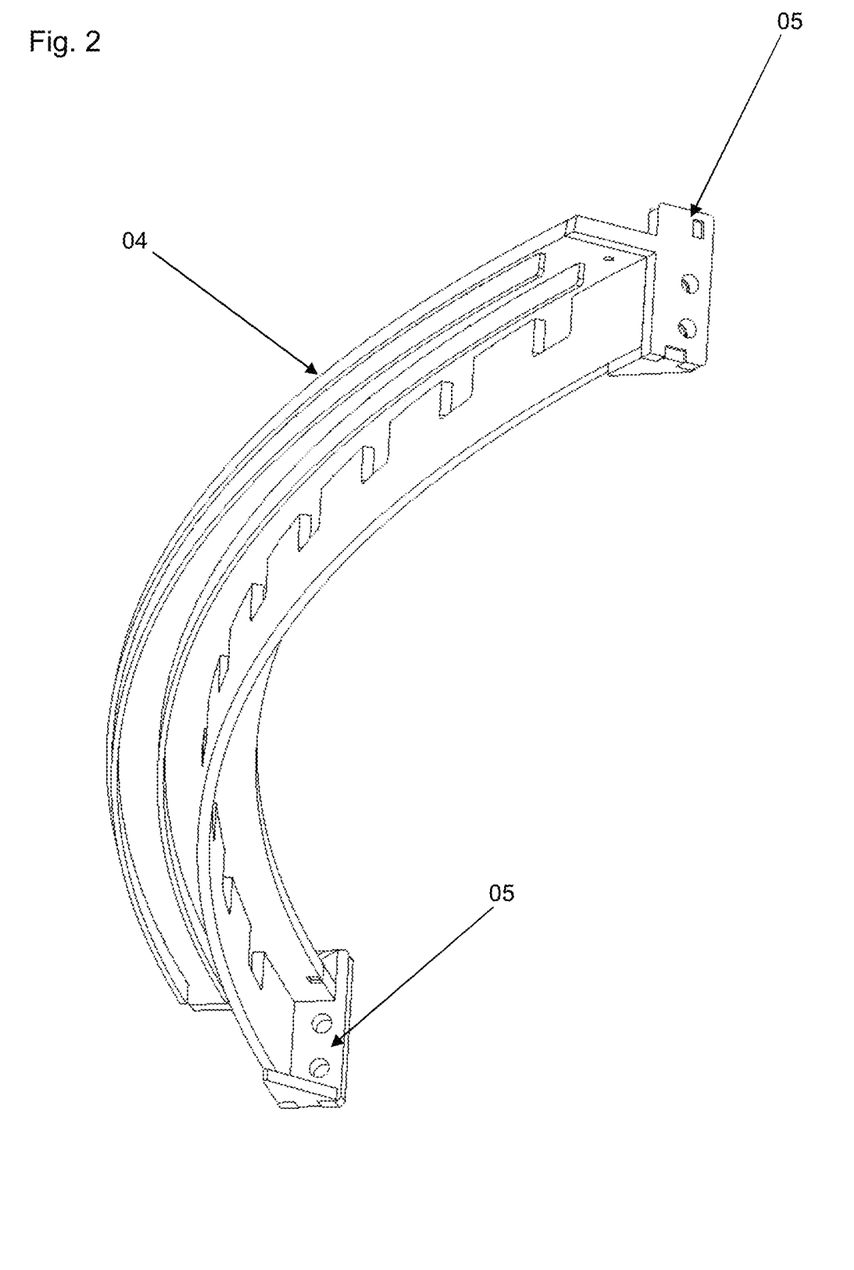
FIGS. 2-4 show isometric views of details of the load distributor assembly.
Figure 3:
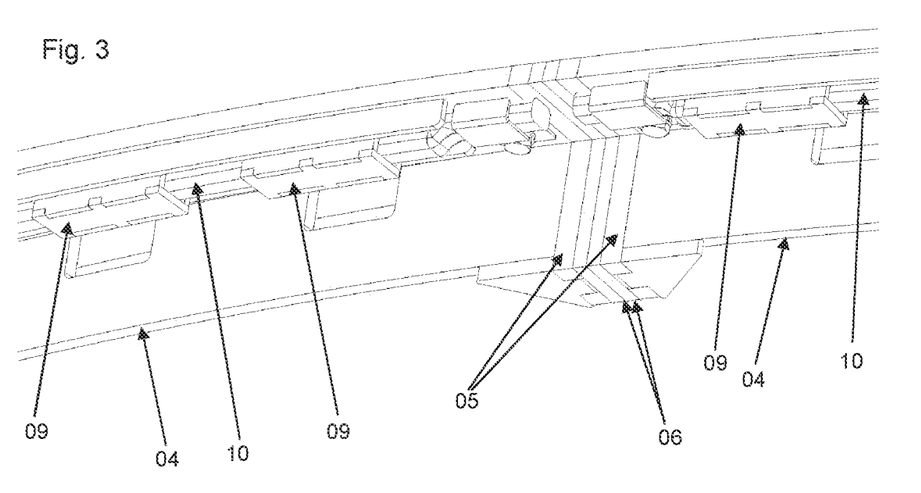
Figure 4:
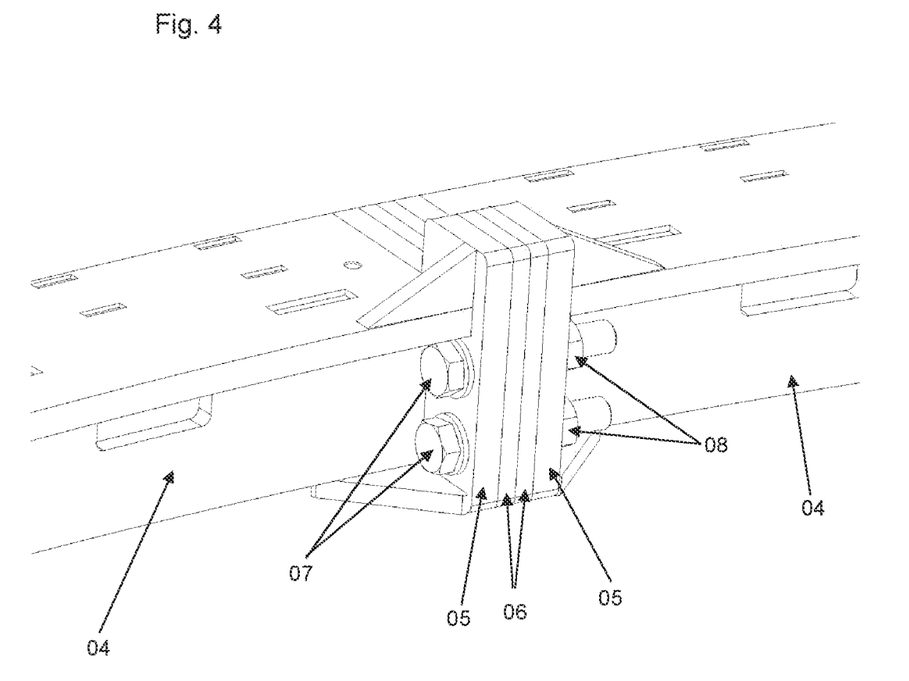

As seen of FIG. 2, this may be done by means of section connection flanges 05 located on each end of the load distributor sections and adapted to fit together with connection flanges on adjacent load distributor sections. This may in an embodiment as shown on FIG. 4 be done with bolts 07 and nuts 08. To adjust the load distributor assembly outer dimensions with respect to both outer circumference and its shape to a perfect fit with the inner side of the reactor shell at the location adjacent and above the reactor support ring, circumference adjusting means 06 may be located between some or each of the load distributor sections. An embodiment where shims are used as circumference adjusting means can be seen on FIG. 3, where also individually adjustable distribution members 09 and load transfer adjusting means 10 are shown. Both the load transfer adjusting means and the individually adjustable distribution members transfer load from the internals (not shown) supported on the load distributor assembly evenly to the reactor support ring in a plurality of locations which can be independently adjusted to provide a perfect fit to the reactor support ring and the inner side of the reactor shell. In this embodiment, gasket rope serves as load transfer adjusting means in cooperation with shims (not shown) located under the individually adjustable distribution members, which is this embodiment are in the form of gasket grooves. The shape of the gasket grooves can be seen in more details on FIGS. 6 and 7.

Figure 5:
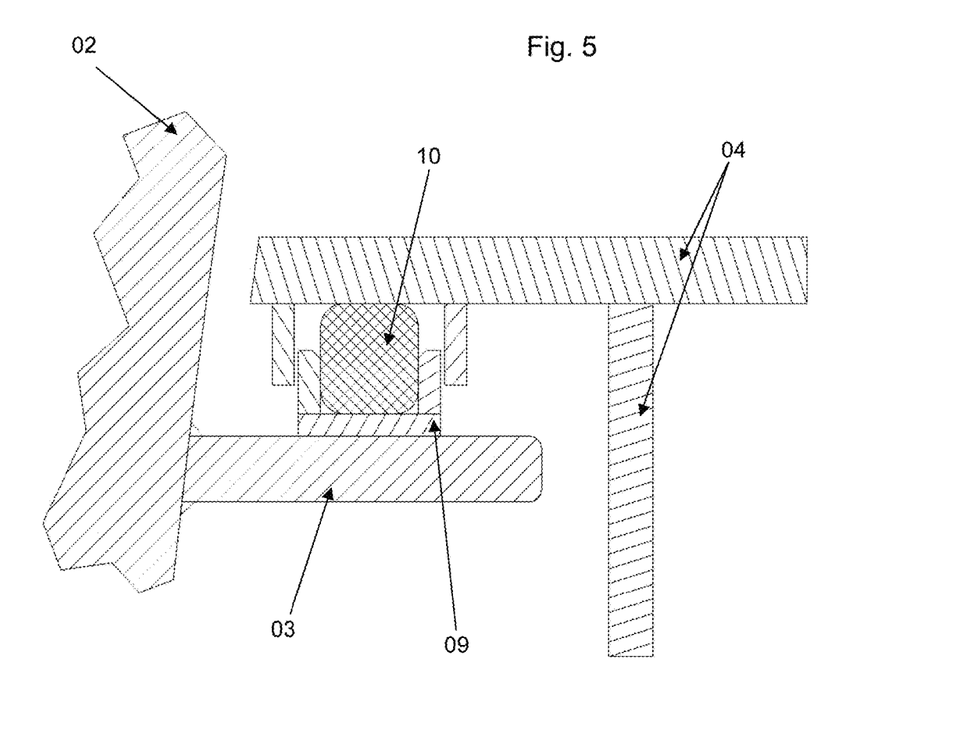
FIG. 5 shows a cross sectional view of a part of the reactor shell, support ring and load distributor assembly.
Figure 6:
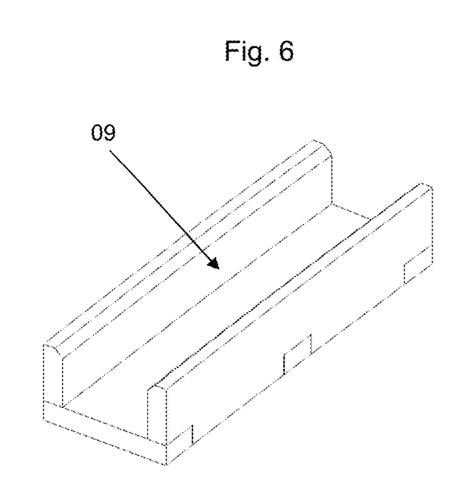
FIGS. 6-7 show isometric view of an individually adjustable distribution member.
Figure 7:
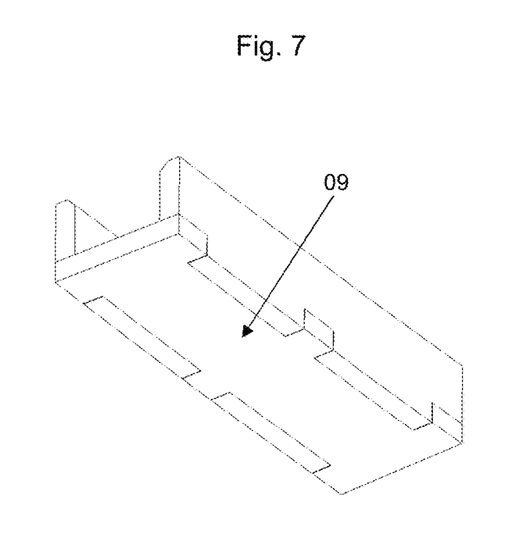

This can also be seen in a cross sectional view in FIG. 5, where the interrelation between the load distributor assembly and the reactor shell 02 and reactor support ring 03 is more clear. From this view it is more clear how the load distributor section transfers a load to the load transfer adjusting means, further to the individually adjustable distribution member, optional further to yet another load transfer means such as a shim (not shown) located between the individually adjustable distribution member and the reactor support ring and onto the reactor support ring. The load distributor assembly according to the invention enables the load transfer point from the individually adjustable distribution member to the reactor support ring to be as close to the inner side of the reactor shell as possible. I.e. the distance from the inner side of the reactor shell to the load transfer point is minimized, thus minimizing the bending moment experienced in the fix-point of the reactor support ring to the reactor shell. In the embodiment shown the load distributor assembly has two rectangular cross sectional shaped parts fixed together, one with a horizontal orientation and another with a vertical orientation to accept the loads from the internals.

Figure 8:
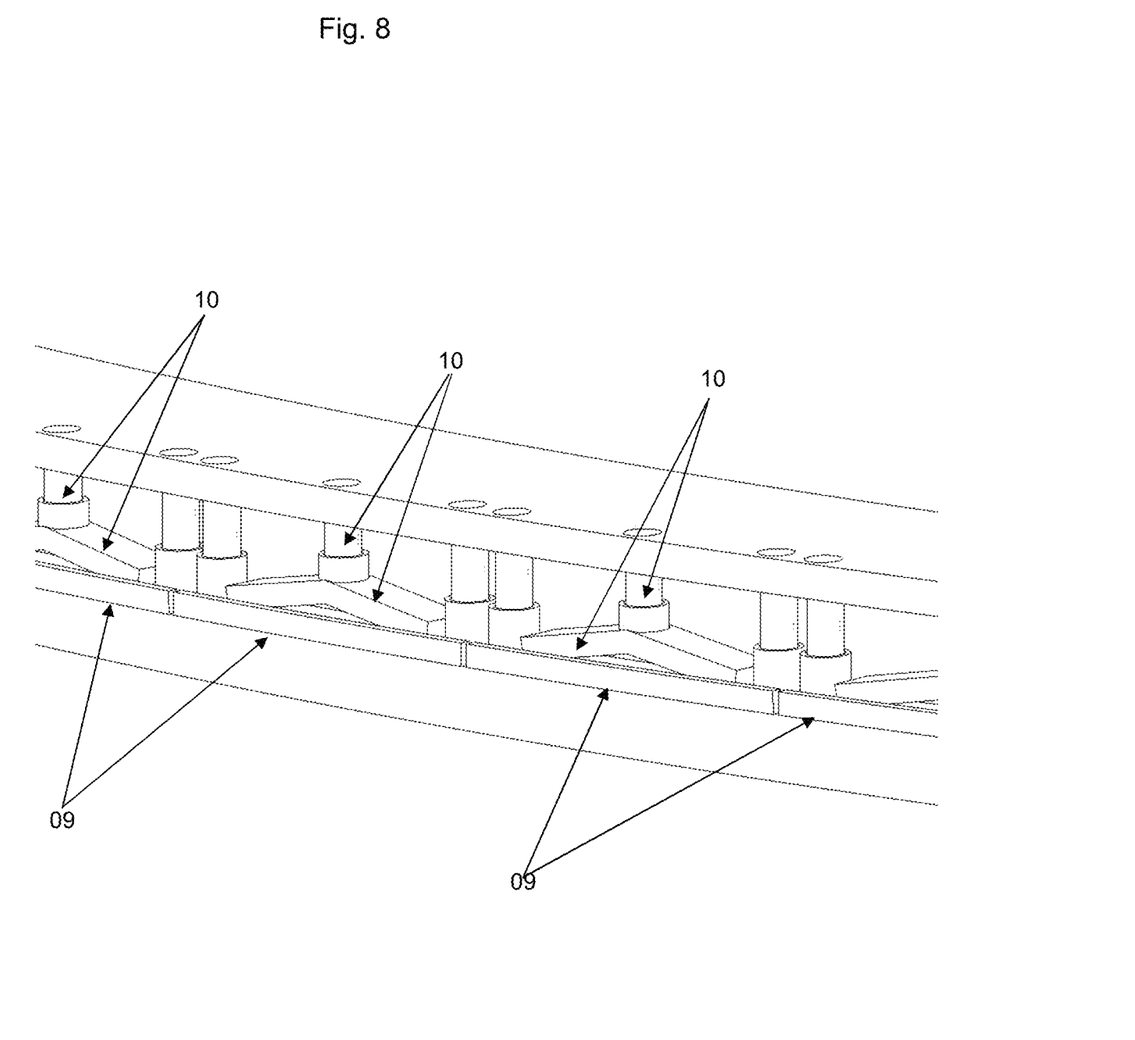
FIG. 8 shows a detail isometric view of the load distributor assembly.
Figure 9:
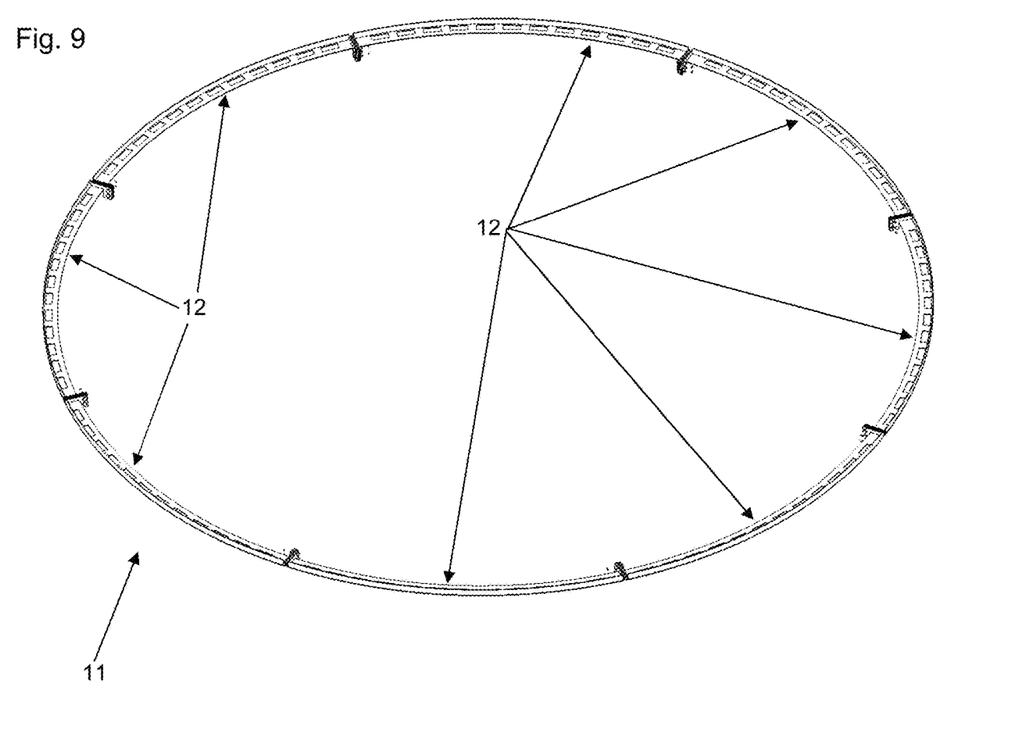
FIG. 9 shows an isometric view of the segmented ring template.
Figure 10:
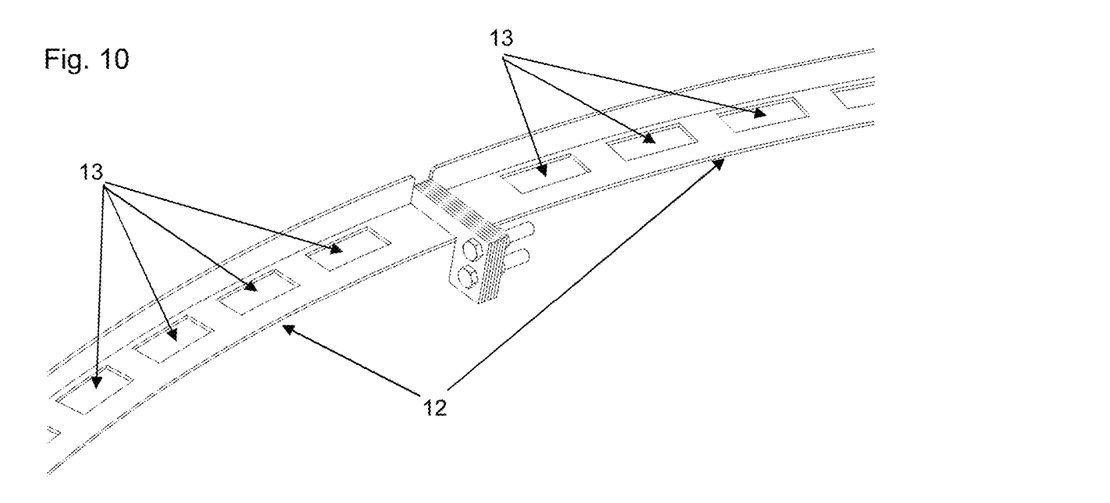
FIG. 10 shows a detail isometric view of the segmented ring template.

The load transfer adjusting means may be in any applicable form. Instead of, or in combination with the gasket rope, the load transfer adjusting means may be adjustable by means of threaded rods or screws as can be seen in FIG. 8. To ensure an easy mounting and exact fit, the individually adjustable distribution members and in some cases also the load transfer adjusting means in form of shims, may be located by the use of a segmented ring template 11 as seen on FIG. 9. The segmented ring template is adapted to fit both the reactor support ring and the load distributor assembly. In an embodiment it is assembled from ring template segments 12, optionally with the use of shims in between connection flanges corresponding to the load distributor assembly as discussed in the above. The ring template segments comprise ring template apertures 13 adapted to receive and securely locate the individually adjustable distribution members and any optional shims when adapting and installing the load distributor assembly on the reactor support ring in the catalytic reactor.

EXAMPLE

A test with 10 measurements was made to investigate the compression properties of a glass fiber gasket rope, with a cross sectional dimension of 25×25 mm.

The table shows the correlation between the compression force in kg in column "0" and the recorded total height in mm of the test setup.

|    | 0    | 1     |
|----|------|-------|
| 0  | 10   | 14.55 |
| 1  | 115  | 9.77  |
| 2  | 210  | 8.41  |
| 3  | 305  | 7.71  |
| 4  | 400  | 7.15  |
| 5  | 535  | 6.73  |
| 6  | 615  | 6.36  |
| 7  | 710  | 6     |
| 8  | 825  | 4.58  |
| 9  | 1215 | 4.24  |
| 10 | 1410 | 3.85  |

The invention claimed is:

1. A catalytic reactor for chemical reactions, comprising a reactor shell and a reactor support ring or support structure fixed to an inner side of the reactor shell and further comprising a load distributor assembly with a load transfer means to transfer a load from the load distributor assembly to the reactor support ring or support structure, wherein said load distributor assembly is adapted to support said load transfer means on an upper side of the reactor support ring or support structure and adjacent to the inner side of the reactor shell.

2. A catalytic reactor according to claim 1, wherein the distance from the centre of a lower side of said load transfer means and the inner side of the reactor shell is less than 100 mm.

3. A catalytic reactor according to claim 1, wherein said load distributor assembly comprises a plurality of segments adapted to be fixed together.

4. A catalytic reactor according to claim 3, wherein the plurality of segments are fixed together by bolts and nuts, threaded rods and nuts, welding or pins and bores.

5. A catalytic reactor according to claim 1, wherein the load distributor assembly comprises a circumference adjusting means which enables an outer circumference of the load distributor assembly to fit the inner side of the reactor shell.

6. A catalytic reactor according to claim 5, wherein the circumference adjusting means comprises one or more shims or threaded connections.

7. A catalytic reactor according to claim 1, wherein the load transfer means comprises a plurality of individually adjustably distribution members, adapted to be adjusted to fit the upper side of the reactor support ring or support structure.

8. A catalytic reactor according to claim 1, wherein the load transfer means comprises a plurality of individually adjustable distribution members, adapted to be adjusted to fit the inner side of the reactor shell.

9. A catalytic reactor according to claim 1, wherein the position of the load transfer means relative to the load distributor assembly is adapted to be adjusted by a load transfer adjusting means.

10. A catalytic reactor according to claim 9, wherein the load transfer adjusting means comprises a screw.

11. A catalytic reactor according to claim 9, wherein the load transfer adjusting means comprises a shim.

12. A catalytic reactor according to claim 11, wherein the load transfer adjusting means comprises a flexible member.

13. A catalytic reactor according to claim 9, wherein the load transfer means comprises a plurality of individually adjustably distribution members adapted to be adjusted to fit the upper side of the reactor support ring or support structure, and the individually adjustable distribution members comprise a gasket groove and the load transfer adjusting means comprises a gasket rope.

14. A catalytic reactor according to claim 1, wherein the load distributor assembly comprises a ring with a horizontal rectangular cross sectional part.

15. A catalytic reactor according to claim 1, wherein the load distributor assembly comprises a ring with a horizontal rectangular cross sectional part and a vertical rectangular cross sectional part which are fixed together.

16. A catalytic reactor according to claim 1, wherein said load distributor assembly comprises circular ring segments adapted to be fixed together.

17. A catalytic reactor according to claim 1, wherein the load distributor assembly has a circular outer circumference.

18. A system for mounting a load distributor assembly in a catalytic reactor for chemical reactions, comprising a reactor shell and a reactor support ring or support structure fixed to an inner side of the reactor shell, wherein the system comprises a segmented ring template adapted to fit the inner side of the reactor shell and an upper side of the reactor support ring or support structure, said segmented ring template comprises apertures adapted to receive a load transfer means for the load distributor assembly and locate the load transfer means in an evenly distributed ring pattern on the reactor support ring or support structure.

19. A catalytic reactor according to claim 1, wherein said catalytic reactor is a hydroprocessing reactor.

* * * * *